United States Patent
Braun

(10) Patent No.: US 8,814,437 B2
(45) Date of Patent: Aug. 26, 2014

(54) ROLLER BEARING CAGE AND METHOD FOR THE PRODUCTION THEREOF

(75) Inventor: Wolfgang Braun, Bergrheinfeld (DE)

(73) Assignee: Schaeffler Tecnologies GmbH & Co. KG, Herzohenaurach (DE)

( * ) Notice: Subject to any disclaimer, the term of this patent is extended or adjusted under 35 U.S.C. 154(b) by 43 days.

(21) Appl. No.: 13/817,853

(22) PCT Filed: Aug. 3, 2011

(86) PCT No.: PCT/EP2011/063329
§ 371 (c)(1),
(2), (4) Date: May 3, 2013

(87) PCT Pub. No.: WO2012/022616
PCT Pub. Date: Feb. 23, 2012

(65) Prior Publication Data
US 2013/0216174 A1    Aug. 22, 2013

(30) Foreign Application Priority Data
Aug. 20, 2010  (DE) .......................... 10 2010 034 962

(51) Int. Cl.
*F16C 33/46*  (2006.01)
*F16C 33/56*  (2006.01)
*B21D 53/12*  (2006.01)

(52) U.S. Cl.
USPC ...... 384/572; 384/623; 384/625; 29/898.067; 29/898.13; 427/248.1

(58) Field of Classification Search
USPC ......... 384/279, 490, 548, 572, 618, 625, 902, 384/907.1, 912–913, 623; 148/518, 537; 29/898.04, 898.13–898.14, 898.067; 427/248.1
See application file for complete search history.

(56) References Cited

U.S. PATENT DOCUMENTS

| | | | | |
|---|---|---|---|---|
| 5,635,243 A | * | 6/1997 | Turchan et al. | 148/512 |
| 5,648,127 A | * | 7/1997 | Turchan et al. | 427/596 |
| 5,660,485 A | * | 8/1997 | Podhajecki et al. | 384/572 |
| 5,971,614 A | * | 10/1999 | Kane et al. | 384/12 |
| 6,450,393 B1 | * | 9/2002 | Doumanidis et al. | 156/73.1 |
| 6,454,972 B1 | * | 9/2002 | Morisette et al. | 264/39 |
| 7,077,334 B2 | * | 7/2006 | Sachs et al. | 239/11 |
| 7,077,573 B2 | * | 7/2006 | Suh et al. | 384/129 |
| 2003/0174918 A1 | * | 9/2003 | Suh et al. | 384/125 |
| 2012/0082541 A1 | * | 4/2012 | Macchia et al. | 29/888 |

FOREIGN PATENT DOCUMENTS

| | | |
|---|---|---|
| DE | 102008013285 | 9/2009 |
| DE | 102008022311 | 11/2009 |
| EP | 753598 A1 * | 1/1997 |
| JP | 2008038978 | 2/2008 |
| JP | 2009208135 A * | 9/2009 |
| JP | 2010249162 | 11/2010 |

* cited by examiner

*Primary Examiner* — Marcus Charles
(74) *Attorney, Agent, or Firm* — Volpe and Koenig, P.C.

(57) ABSTRACT

A method for producing a roller bearing cage (1) is provided, including the following steps: a base body (2) which is close to a net shape is produced by a stereolithography method or by a 3D-printing method, and the provided base body (2) is coated with a thin, nanocrystalline coating (3). A roller bearing cage, including a base body (2) and a nanocrystalline coating (3) fixed to the base body (2) produced by this method is also provided. This method is suitable for producing roller bearing cages in only small quantities in a small series.

11 Claims, 1 Drawing Sheet

ROLLER BEARING CAGE AND METHOD FOR THE PRODUCTION THEREOF

CROSS-REFERENCE TO RELATED APPLICATIONS

This application is a 371 National Phase of International Application No. PCT/EP2011/063329, filed Aug. 3, 2011, which claims the benefit of German Patent Application No. 102010034962.3, filed Aug. 20, 2010.

FIELD OF THE INVENTION

Background

The invention relates to a bearing component of a roller bearing or plain bearing, in particular to a roller bearing cage of a roller bearing, and also to a method for producing the bearing component, in particular the bearing cage.

The invention will be described in more detail and explained hereinbelow with reference to a bearing cage as a bearing component of a roller bearing; it shall be understood, however, that the description applies mutatis mutandis to other bearing components of a roller bearing or plain bearing, for example to bearing rings or guide rings or sealing elements or components thereof.

It is known from experience to manufacture roller bearing cages from a metal or a plastic, for example. Specifically, plastic cages coated with a metal are known. In this case, difficulties arise if only small quantities of the cage are to be manufactured, since the known production methods are designed and optimized for mass production.

DE 10 2008 022 311 A1 describes a roller bearing cage comprising a base body made of a plastic and also a nanocrystalline coating made of a metal, the coating mechanically stabilizing the base body and rendering it wear-resistant and corrosion-resistant. The roller bearing cage is produced by firstly providing the base body as an injection molding made of a thermoplastic, and then applying the nanocrystalline coating by means of an electrochemical method, in particular a galvanic method. The production of the base body by injection molding is complicated and presupposes expensive plastics engineering tools, which are only economical in high quantities. It is in any event not economical to manufacture only small quantities in low-volume production.

SUMMARY

It is an object of the invention to provide a method for producing a bearing component, in particular a roller bearing cage, which is suitable for manufacturing only small quantities in low-volume production.

According to the invention, this object is achieved by a method for producing a bearing component, in particular a roller bearing cage, comprising the following steps: providing a near net shape base body produced by means of a stereolithographic method or by means of a 3D printing method, and coating the provided base body with a thin, nanocrystalline coating. This object is likewise achieved by a bearing component, in particular a roller bearing cage, comprising a base body and a nanocrystalline coating fixed to the base body, characterized in that the base body is produced by means of a stereolithographic method or by means of a 3D printing method.

Both alternative manufacturing steps of the first method step, specifically both the stereolithographic method and the 3D printing method, are particularly suitable for producing a base body specifically of the roller bearing cage which, in its three-dimensional form, already substantially corresponds to the form of the roller bearing cage, to be precise in a very short time in an only small quantity. The base body obtained after the first method step is near net shape, i.e. corresponds in dimensions already substantially to the finished roller bearing cage, except for the nanocrystalline coating still to be applied in the second method step. However, the base body still has a mechanical strength or chemical resistance which is not sufficient for the intended application, and therefore the coating applied in the second method step brings about a mechanical and also chemical strength due to the nanocrystalline properties.

A stereolithographic method is deemed to be a method for producing the base body in which a liquid, for example a photopolymer, is provided in a container. A targeted irradiation of selected portions of the photopolymer allows the latter to harden, such that a cohesive three-dimensional form which forms the base body arises. By way of example, it can be provided to guide a laser beam directed through the photopolymer, such that the laser beam hardens the photopolymer. Specifically, it can be provided to guide two or more laser beams through the photopolymer, which make it possible for the photopolymer to harden at the point at which they each intersect. It shall be understood here that, instead of a liquid, a substantially dimensionally stable gel which cures under radiation can also be provided, from which the base body forms; consideration can be given here in particular to a 2-photon photopolymerization. As an alternative to this, it is possible to provide a container containing granules or powder, through which at least one laser beam which allows the granules or powder to locally melt is guided, such that a three-dimensional form arises.

A 3D printing method is deemed to be a method for producing the base body in which a three-dimensional form is formed in layers, by depositing layers and allowing them to harden. Here, by way of example in a powder-based 3D printing method, a thin layer of a powder can be applied and selectively solidified, for example by means of a piezoelectric printing head, which applies a binder to the intended locations. In a modified 3D printing method, a liquid, for example a photopolymer, is deposited as a layer by means of a printer head and allowed to harden under radiation; many layers fixed to one another then provide the three-dimensional form of the base body. In a modification thereto, granules can be melted in layers and fixed to one another in order to form the three-dimensional form.

It shall be understood here that the method according to the invention is not limited to the possible ways indicated by way of example for carrying out the production of the base body in the first method step, by means of the stereolithographic method or by means of the 3D printing method.

It is preferably provided in terms of carrying out the method that the coating comprises an electrochemical deposition step, in particular an electrodeposition step.

As an alternative to this, it is provided in terms of carrying out the method that the coating comprises a vapor deposition step, in particular a CVD or PVD step.

It is preferably provided in terms of carrying out the method that the base body is provided as a hollow part. By way of example, if the base body is provided by means of the stereolithographic method, it is possible for a three-dimensional form to be formed which does not form a closed face, but rather a face provided with at least one hole, such that the remaining, substantially liquid, granular or gel-like material located within the three-dimensional form can escape or can be removed through the at least one hole. The stereolithographic method or the 3D printing method is particularly suitable especially for the production of hollow parts, since hollow parts can only be produced in a complex manner using other plastics engineering methods.

It is preferable in terms of the bearing component, in particular the bearing component produced by means of the method according to the invention, that the base body is formed as a hollow part. The hollow base body reduces the weight of the bearing component and may accommodate lubricant, for example.

It is preferably provided in terms of the bearing component that the nanocrystalline coating is formed as a metallic coating having a layer thickness of approximately 20 μm to approximately 1000 μm. Due to the small layer thickness, the base body may already correspond substantially to the finished bearing component in its dimensions. Such layers having only a small layer thickness can be deposited, for example, by electrochemical methods, specifically electrodeposition, or, as an alternative thereto, by vapor deposition, specifically by means of PVD (Physical Vapor Deposition) technology or CVD (Chemical Vapor Deposition) technology. The small layer thickness is sufficient for providing the mechanically less stable base body with the strength which the bearing component necessitates for later use.

It is preferably provided that the nanocrystalline coating has a mean grain size of less than approximately 500 nanometers, particularly preferably less than approximately 100 nanometers, which, on account of the nanocrystalline structure, even as a thin layer brings about a high inherent stiffness of the bearing component.

Suitable materials for the coating are transition metals such as nickel, cobalt or iron, specifically also alloys which contain at least one of the three metals noted. As an alternative or in addition thereto, silver, titanium or copper can also be provided as the material for the coating, or an alloy which contains at least one of the three metals noted.

The nanocrystalline coating applied in the second method step can cover the base body completely or can be provided only in certain portions, for example on those portions of the surface of the base body which are exposed to increased friction with a high introduction of heat or to increased wear.

Further advantages and features become apparent from the dependent claims and also from the following description of a preferred exemplary embodiment of the invention.

The invention will be described in more detail and explained hereinbelow with reference to the accompanying drawings.

DETAILED DESCRIPTION OF THE PREFERRED EMBODIMENTS

Figures 1, 2:
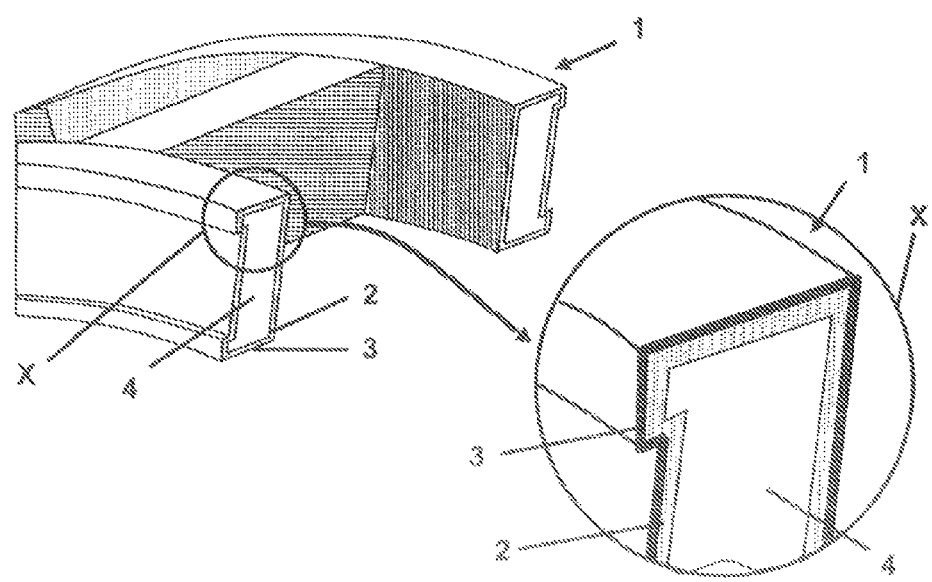
FIG. 1 shows a view, partly in section, of an exemplary embodiment of a bearing component according to the invention, which is produced after the method according to the invention has been carried out by way of example.
FIG. 2 shows the section 'X' from FIG. 1 on an enlarged scale.

FIG. 1, or FIG. 2, shows a bearing component formed as a roller bearing cage 1, wherein the body of the roller bearing cage 1 has a base body 2 made of a hardened photopolymer and also a coating 3 made of a nanocrystalline metal. The coating 3 has a substantially homogeneous thickness of approximately 20 microns to approximately 1000 microns, in the present case approximately 100 microns, and is fixed to the base body 2. To promote the adhesion of the nanocrystalline coating 3 on the base body 2, provision is made of an intermediate layer, the layer thickness of which is only several microns and is therefore negligible compared to the layer thickness of the nanocrystalline coating 2. The nanocrystalline coating 2 consists of an iron-nickel alloy, the crystallites of which have a mean grain diameter of less than approximately 500 nanometers.

The base body 2 is formed as a hollow part with a two-dimensional face, substantially closed in three-dimensional space, having a substantially constant wall thickness of only a few millimeters. The hollow part surrounds a cavity 4, which can be filled for example with air or a lubricant. The substantially closed face of the hollow part is pierced at a location not shown in the image, such that a hole, through which air or lubricant can enter or escape, forms in the base body 2.

During the production of the roller bearing cage 1, in a first method step the base body 2 is produced by means of a stereolithographic method, in which the photopolymer is provided as a liquid in a container, and then the photopolymer is locally cured under the irradiation of a guided laser beam, such that the wall of the base body 2 is formed as a thin, mechanically compliant three-dimensional form with a hole. The photopolymer which is not cured and has remained in the base body 2 can escape through the hole, such that the cavity 4 forms. The laser beam is in this case controlled by a computer, in which the net shape of the body of the roller bearing cage 1 is stored, such that the base body 2 obtained has a near net shape. It shall be understood that the form of the near net shape base body 2 can be determined and adapted specifically on a case-by-case basis, in order to be able to take coatings 3 with various layer thicknesses into consideration.

In a later, second method step, the base body 2 is coated with the nanocrystalline coating 3 by means of an electrochemical galvanic method, which comprises an electrodeposition step. The mechanical properties of the thin nanocrystalline coating 3 in this case ensure that the roller bearing cage 2 obtained is provided with the mechanical properties required for the intended use, such as stiffness, wear resistance and thermal conductivity and chemical resistance.

In the exemplary embodiment described above, the near net shape base body 2 was produced by means of a stereolithographic method, e.g. by curing a photopolymer under the action of a UV laser. It shall be understood that other possible ways of carrying out the stereolithographic method are also conceivable. It shall be understood further that the near net shape base body 2 can also be produced by a 3D printing method. If the three-dimensional form of the body of the roller bearing cage 1 or of the base body 2 is known, for example predefined computationally, the base body 2 can be calculated by means of the stereolithographic method as a near net shape intermediate part in such a manner that the provided net shape with the ultimate dimensions can be obtained after the coating.

List of Reference Signs

1 Roller bearing cage
2 Base body
3 Nanocrystalline coating
4 Cavity

The invention claimed is:
1. A method for producing a roller bearing cage, comprising the following steps:

providing an integrally formed near net shape base body that defines the roller bearing cage structure produced by a stereolithographic method or by 3D printing, and coating the integrally formed near net shape base body with a thin, nanocrystalline coating.

2. The method as claimed in claim 1, wherein the coating comprises an electrochemical deposition step.

3. The method as claimed in claim 1, wherein the coating comprises a vapor deposition step.

4. The method as claimed in claim 1, wherein the base body is a hollow part.

5. The method as claimed in claim 4, filling a lubricant into the hollow part of the base body.

6. A roller bearing cage produced by the method as claimed in claim 1.

7. A roller bearing cage comprising an integrally formed near net shape base body that defines the roller bearing cage structure produced by a stereolithographic method or 3D printing, and a nanocrystalline coating fixed over an entire surface of the integrally formed near net shape base body.

8. The roller bearing cage as claimed in claim 7, wherein the base body is a hollow part.

9. The roller bearing cage as claimed in claim 8, further comprising lubricant located in the hollow part of the base body.

10. The roller bearing cage as claimed in claim 7, wherein the nanocrystalline coating is a metallic coating having a layer thickness of approximately 20 μm to approximately 1000 μm.

11. The roller bearing cage as claimed in claim 7, wherein the nanocrystalline coating has a mean grain size of less than approximately 500 nanometers.

\* \* \* \* \*